(12) United States Patent
Tomioka

(10) Patent No.: US 7,400,453 B2
(45) Date of Patent: Jul. 15, 2008

(54) ZOOM LENS

(75) Inventor: Ukyo Tomioka, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 72 days.

(21) Appl. No.: 11/589,054

(22) Filed: Oct. 30, 2006

(65) Prior Publication Data
US 2007/0146898 A1    Jun. 28, 2007

(30) Foreign Application Priority Data
Oct. 31, 2005   (JP) ............................ P2005-316217
Jun. 19, 2006   (JP) ............................ P2006-168954

(51) Int. Cl.
*G02B 15/14*   (2006.01)
(52) U.S. Cl. ...................... 359/687; 359/686
(58) Field of Classification Search .................. 359/686, 359/687
See application file for complete search history.

(56) References Cited
U.S. PATENT DOCUMENTS
5,654,826 A * 8/1997 Suzuki ....................... 359/557

| 6,094,312 A | 7/2000 | Nakayama |
| 6,104,547 A | 8/2000 | Nanba |
| 2003/0151828 A1 | 8/2003 | Ozaki |
| 2005/0088756 A1 | 4/2005 | Yamada |

FOREIGN PATENT DOCUMENTS
JP    3601733 B2   10/2004

* cited by examiner

*Primary Examiner*—William C Choi
(74) *Attorney, Agent, or Firm*—Birch, Stewart, Kolasch & Birch, LLP

(57) ABSTRACT

A zoom lens is provided and has a first group having a positive refractive power, a second group having a negative refractive power, an aperture stop, a third group having a positive refractive power and a fourth group having a positive refractive power, which groups are arranged in this order from the object side. The first group has a three-group four-lens configuration where a cemented lens of a negative lens and a positive lens, and two positive single-lenses and are disposed in this order from the object side. The second group has a three-group four-lens configuration where two single-lenses and each having a negative refractive power with a strong concave surface on the image side, and a cemented lens of a double-concave lens and a positive lens are disposed in this order from the object side.

6 Claims, 17 Drawing Sheets

FIG. 5

| | FUNDAMENTAL LENS DATA OF EXAMPLE 1 | | | |
|---|---|---|---|---|
| Si (SURFACE NUMBER) | Ri (CURVATURE RADIUS) | Di (SURFACE SPACING) | Ndj (REFRACTIVE INDEX) | vdj (ABBE NUMVER) |
| 1 | 47.1496 | 1.35 | 1.92286 | 18.9 |
| 2 | 32.1427 | 4.73 | 1.58913 | 61.2 |
| 3 | 175.2411 | 0.20 | | |
| 4 | 40.7665 | 2.72 | 1.62041 | 60.3 |
| 5 | 98.6773 | 0.10 | | |
| 6 | 24.8208 | 3.17 | 1.62041 | 60.3 |
| 7 | 56.1802 | D7 (VARIABLE) | | |
| 8 | 59.2326 | 0.66 | 2.00069 | 25.5 |
| 9 | 6.2952 | 1.24 | | |
| 10 | 11.9183 | 1.26 | 1.83400 | 37.2 |
| 11 | 7.3138 | 2.65 | | |
| 12 | -15.1811 | 1.06 | 1.58913 | 61.2 |
| 13 | 7.7483 | 2.49 | 1.92286 | 18.9 |
| 14 | 52.9949 | D14 (VARIABLE) | | |
| 15 (APERTURE STOP) | — | 0.50 | | |
| *16 | 17.5454 | 4.44 | 1.58913 | 61.2 |
| *17 | -21.0080 | 0.31 | | |
| 18 | -16.4166 | 1.69 | 1.67270 | 32.1 |
| 19 | -25.1715 | D19 (VARIABLE) | | |
| *20 | 21.9406 | 2.16 | 1.58913 | 61.2 |
| *21 | -47.5101 | 0.10 | | |
| 22 | 21.3541 | 1.03 | 1.92286 | 18.9 |
| 23 | 9.4046 | 2.30 | 1.58913 | 61.2 |
| 24 | ∞ | D24 (VARIABLE) | | |
| 25 | ∞ | 1.86 | 1.51633 | 64.1 |
| 26 | ∞ | | | |

(*ASPHERIC)

FIG. 6A

| DATA ABOUT ZOOMING IN EXAMPLE 1 | | | | | | | |
|---|---|---|---|---|---|---|---|
| | FOCAL LENGTH | FNO. | VIEW ANGLE (2ω) | D7 | D14 | D19 | D24 |
| WIDE-ANGLE END | 3.40mm | 1.46 | 69.0° | 0.62 | 24.15 | 9.59 | 8.00 |
| TELEPHOTO END | 115.57mm | 4.17 | 2.2° | 23.46 | 1.31 | 14.30 | 3.29 |

FIG. 6B

| ASPHERIC DATA OF EXAMPLE 1 | | | | |
|---|---|---|---|---|
| ASPHERIC COEFFICIENT | SURFACE NUMBER | | | |
| | 16TH SURFACE | 17TH SURFACE | 20TH SURFACE | 21TH SURFACE |
| KA | 0.9970092 | 2.4759018 | 1.5277991 | −6.2004213 |
| $RB_3$ | −4.81520E−05 | 1.77406E−05 | 2.04713E−04 | 2.20870E−04 |
| $RB_4$ | −4.91879E−05 | 9.92678E−06 | −2.46700E−05 | 2.50607E−05 |
| $RB_5$ | 1.76847E−06 | −1.36771E−07 | −3.34504E−07 | −2.72078E−07 |
| $RB_6$ | 3.55263E−08 | 5.22297E−07 | −5.05128E−08 | −9.46976E−08 |
| $RB_7$ | 8.98498E−09 | 6.28436E−08 | −8.84021E−09 | −8.90140E−09 |
| $RB_8$ | 7.34215E−10 | −6.53065E−10 | −1.15135E−09 | −1.74490E−09 |
| $RB_9$ | 2.07035E−10 | −2.38454E−10 | −1.36665E−11 | −3.40289E−10 |
| $RB_{10}$ | 8.68967E−12 | −5.33100E−11 | 4.68936E−12 | −5.77017E−11 |
| $RB_{11}$ | −2.71758E−14 | −9.41080E−12 | −4.00472E−13 | −8.23628E−12 |
| $RB_{12}$ | −2.53796E−13 | −1.49933E−12 | −4.15958E−13 | −7.49137E−13 |
| $RB_{13}$ | −5.24738E−14 | −1.24198E−13 | −1.27987E−13 | −5.51261E−14 |
| $RB_{14}$ | −1.01414E−14 | −1.23505E−14 | −3.60252E−14 | −1.67591E−15 |
| $RB_{15}$ | −2.23171E−15 | 1.02673E−16 | −7.08578E−15 | 2.08273E−16 |
| $RB_{16}$ | −5.59140E−16 | 1.55711E−16 | −1.36534E−15 | 4.34378E−16 |

FIG. 7

| | FUNDAMENTAL LENS DATA OF EXAMPLE 2 | | | |
|---|---|---|---|---|
| Si (SURFACE NUMBER) | Ri (CURVATURE RADIUS) | Di (SURFACE SPACING) | Ndj (REFRACTIVE INDEX) | νdj (ABBE NUMVER) |
| 1 | 47.0697 | 1.39 | 1.92286 | 18.9 |
| 2 | 31.9464 | 4.68 | 1.58913 | 61.2 |
| 3 | 170.7976 | 0.10 | | |
| 4 | 40.5797 | 2.74 | 1.62041 | 60.3 |
| 5 | 97.0823 | 0.10 | | |
| 6 | 24.6576 | 3.31 | 1.62041 | 60.3 |
| 7 | 56.2409 | D7 (VARIABLE) | | |
| 8 | 59.1295 | 0.74 | 2.00069 | 25.5 |
| 9 | 6.2974 | 1.13 | | |
| 10 | 11.8869 | 1.29 | 1.85972 | 35.1 |
| 11 | 7.3177 | 2.57 | | |
| 12 | -15.2203 | 0.70 | 1.61083 | 58.5 |
| 13 | 7.7433 | 2.20 | 1.95545 | 17.7 |
| 14 | 53.4692 | D14 (VARIABLE) | | |
| 15 (APERTURE STOP) | — | 0.83 | | |
| *16 | 17.0129 | 4.49 | 1.56216 | 59.9 |
| *17 | -20.4638 | 0.24 | | |
| 18 | -16.6811 | 2.03 | 1.70281 | 29.9 |
| 19 | -24.4228 | D19 (VARIABLE) | | |
| *20 | 21.2911 | 2.23 | 1.58840 | 54.0 |
| *21 | -44.8350 | 0.10 | | |
| 22 | 14.6042 | 0.65 | 2.20000 | 17.0 |
| 23 | 9.3825 | 2.45 | 1.48000 | 83.1 |
| 24 | ∞ | D24 (VARIABLE) | | |
| 25 | ∞ | 1.86 | 1.51633 | 64.1 |
| 26 | ∞ | | | |

(*ASPHERIC)

FIG. 8A

| DATA ABOUT ZOOMING IN EXAMPLE 2 | | | | | | | |
|---|---|---|---|---|---|---|---|
| | FOCAL LENGTH | FNO. | VIEW ANGLE (2ω) | D7 | D14 | D19 | D24 |
| WIDE-ANGLE END | 3.40mm | 1.42 | 68.7° | 0.62 | 23.95 | 9.44 | 8.00 |
| TELEPHOTO END | 115.60mm | 4.19 | 2.2° | 23.27 | 1.31 | 14.19 | 3.25 |

FIG. 8B

| ASPHERIC DATA OF EXAMPLE 2 | | | | |
|---|---|---|---|---|
| ASPHERIC COEFFICIENT | SURFACE NUMBER | | | |
| | 16TH SURFACE | 17TH SURFACE | 20TH SURFACE | 21TH SURFACE |
| $KA$ | 0.9964213 | 2.4760213 | 1.5279184 | -6.200413 |
| $RB_3$ | -7.27691E-05 | 1.55390E-05 | 1.83620E-04 | 2.19422E-04 |
| $RB_4$ | -5.75710E-05 | 7.85709E-06 | -2.14525E-05 | 2.26351E-05 |
| $RB_5$ | 9.03604E-07 | -4.28831E-07 | 7.94904E-08 | -5.21628E-07 |
| $RB_6$ | -6.96189E-08 | 4.78839E-07 | -1.57131E-08 | -1.09131E-07 |
| $RB_7$ | -6.84307E-10 | 5.78246E-08 | -7.53302E-09 | -8.60615E-09 |
| $RB_8$ | -2.87038E-10 | -1.38685E-09 | -1.23369E-09 | -1.54636E-09 |
| $RB_9$ | 1.29974E-10 | -3.19965E-10 | -4.05732E-11 | -3.10516E-10 |
| $RB_{10}$ | 2.09620E-12 | -6.41078E-11 | -1.44406E-13 | -5.34811E-11 |
| $RB_{11}$ | -4.74747E-13 | -1.05177E-11 | -9.62668E-13 | -7.81154E-12 |
| $RB_{12}$ | -2.94631E-13 | -1.62994E-12 | -4.87788E-13 | -7.00542E-13 |
| $RB_{13}$ | -5.64671E-14 | -1.35727E-13 | -1.34892E-13 | -5.08980E-14 |
| $RB_{14}$ | -1.07833E-14 | -1.34809E-14 | -3.68034E-14 | -1.24130E-15 |
| $RB_{15}$ | -2.32451E-15 | 2.68901E-17 | -7.15314E-15 | 2.41910E-16 |
| $RB_{16}$ | -5.75426E-16 | 1.51860E-16 | -1.37247E-15 | 4.37704E-16 |

FIG. 9

| | Si (SURFACE NUMBER) | Ri (CURVATURE RADIUS) | Di (SURFACE SPACING) | Ndj (REFRACTIVE INDEX) | vdj (ABBE NUMVER) |
|---|---|---|---|---|---|
| | \multicolumn{5}{c}{FUNDAMENTAL LENS DATA OF EXAMPLE 3} |
| 10 | 1 | 47.1489 | 1.35 | 1.92286 | 18.9 |
| | 2 | 32.1322 | 4.72 | 1.58913 | 61.2 |
| | 3 | 173.5133 | 0.10 | | |
| | 4 | 40.4382 | 2.70 | 1.62041 | 60.3 |
| | 5 | 96.5278 | 0.10 | | |
| | 6 | 24.7015 | 3.17 | 1.62041 | 60.3 |
| | 7 | 55.9608 | D7 (VARIABLE) | | |
| 20 | 8 | 59.6536 | 0.66 | 2.00069 | 25.5 |
| | 9 | 6.2950 | 1.24 | | |
| | 10 | 11.9355 | 1.42 | 1.83400 | 37.2 |
| | 11 | 7.3145 | 2.64 | | |
| | 12 | -15.1377 | 0.96 | 1.58913 | 61.2 |
| | 13 | 7.7623 | 2.44 | 1.92286 | 18.9 |
| | 14 | 52.6577 | D14 (VARIABLE) | | |
| | 15 (APERTURE STOP) | — | 0.97 | | |
| 30 | *16 | 17.6014 | 4.46 | 1.58913 | 61.2 |
| | *17 | -20.9007 | 0.30 | | |
| | 18 | -16.4983 | 1.69 | 1.67270 | 32.1 |
| | 19 | -24.9082 | D19 (VARIABLE) | | |
| 40 | *20 | 21.6828 | 2.18 | 1.58913 | 61.2 |
| | *21 | -45.6471 | 0.10 | | |
| | 22 | 20.8710 | 1.10 | 1.92286 | 18.9 |
| | 23 | 9.4379 | 2.22 | 1.58913 | 61.2 |
| | 24 | 124.9993 | D24 (VARIABLE) | | |
| GC | 25 | ∞ | 1.86 | 1.51633 | 64.1 |
| | 26 | ∞ | | | |

(*ASPHERIC)

FIG. 10A

| | DATA ABOUT ZOOMING IN EXAMPLE 3 | | | | | | |
|---|---|---|---|---|---|---|---|
| | FOCAL LENGTH | FNO. | VIEW ANGLE (2ω) | D7 | D14 | D19 | D24 |
| WIDE-ANGLE END | 3.39mm | 1.46 | 69.3° | 0.64 | 24.07 | 9.34 | 8.00 |
| TELEPHOTO END | 115.38mm | 4.17 | 2.2° | 23.41 | 1.30 | 14.04 | 3.30 |

FIG. 10B

| | ASPHERIC DATA OF EXAMPLE 3 | | | |
|---|---|---|---|---|
| ASPHERIC COEFFICIENT | SURFACE NUMBER | | | |
| | 16TH SURFACE | 17TH SURFACE | 20TH SURFACE | 21TH SURFACE |
| KA | 0.9970526 | 2.4758959 | 1.527876 | −6.20042 |
| $RB_3$ | −5.30140E−05 | 2.01481E−05 | 2.08438E−04 | 2.37143E−04 |
| $RB_4$ | −4.82918E−05 | 1.00277E−05 | −2.22967E−05 | 2.46183E−05 |
| $RB_5$ | 1.69317E−06 | −9.34791E−08 | −1.20789E−08 | −4.07499E−07 |
| $RB_6$ | 2.61464E−08 | 5.29572E−07 | −2.70979E−08 | −1.00317E−07 |
| $RB_7$ | 8.44756E−09 | 6.34196E−08 | −8.56667E−09 | −8.02670E−09 |
| $RB_8$ | 6.84412E−10 | −5.94358E−10 | −1.27533E−09 | −1.53604E−09 |
| $RB_9$ | 1.96358E−10 | −2.38208E−10 | −3.05665E−11 | −3.17914E−10 |
| $RB_{10}$ | 6.64268E−12 | −5.42683E−11 | 3.00413E−12 | −5.54256E−11 |
| $RB_{11}$ | −2.68677E−13 | −9.64377E−12 | −4.83378E−13 | −8.08495E−12 |
| $RB_{12}$ | −2.81039E−13 | −1.55227E−12 | −4.14569E−13 | −7.39905E−13 |
| $RB_{13}$ | −5.40843E−14 | −1.32538E−13 | −1.26830E−13 | −5.49931E−14 |
| $RB_{14}$ | −1.00943E−14 | −1.38176E−14 | −3.57870E−14 | −1.73178E−15 |
| $RB_{15}$ | −2.19311E−15 | −9.17174E−17 | −7.05647E−15 | 1.98077E−16 |
| $RB_{16}$ | −5.49396E−16 | 1.25580E−16 | −1.36134E−15 | 4.32895E−16 |

FIG. 11

| | FUNDAMENTAL LENS DATA OF EXAMPLE 4 | | | |
|---|---|---|---|---|
| Si (SURFACE NUMBER) | Ri (CURVATURE RADIUS) | Di (SURFACE SPACING) | Ndj (REFRACTIVE INDEX) | νdj (ABBE NUMVER) |
| 1 | 49.7582 | 1.36 | 1.84666 | 23.8 |
| 2 | 25.0889 | 5.31 | 1.71300 | 53.9 |
| 3 | 115.0803 | 0.10 | | |
| 4 | 44.3384 | 2.32 | 1.58913 | 61.2 |
| 5 | 87.8247 | 0.10 | | |
| 6 | 26.0140 | 3.18 | 1.71300 | 53.9 |
| 7 | 65.8706 | D7 (VARIABLE) | | |
| 8 | 71.0809 | 0.66 | 1.83400 | 37.2 |
| 9 | 6.1468 | 1.17 | | |
| 10 | 12.4759 | 0.70 | 1.83400 | 37.2 |
| 11 | 7.1808 | 3.57 | | |
| 12 | -14.0446 | 0.70 | 1.58913 | 61.2 |
| 13 | 7.4701 | 1.98 | 1.84666 | 23.8 |
| 14 | 53.6647 | D14 (VARIABLE) | | |
| 15 (APERTURE STOP) | — | 0.80 | | |
| *16 | 15.5633 | 4.22 | 1.56384 | 60.7 |
| *17 | -17.5525 | 0.30 | | |
| 18 | -16.5197 | 0.74 | 1.84666 | 23.8 |
| 19 | -25.4345 | D19 (VARIABLE) | | |
| *20 | 19.7993 | 2.12 | 1.56384 | 60.7 |
| *21 | -36.5760 | 0.32 | | |
| 22 | 21.1680 | 0.65 | 1.84666 | 23.8 |
| 23 | 9.0852 | 2.09 | 1.48749 | 70.2 |
| 24 | ∞ | D24 (VARIABLE) | | |
| 25 | ∞ | 1.86 | 1.51633 | 64.1 |
| 26 | ∞ | | | |

(*ASPHERIC)

FIG. 12A

| DATA ABOUT ZOOMING IN EXAMPLE 2 | | | | | | | |
|---|---|---|---|---|---|---|---|
| | FOCAL LENGTH | FNO. | VIEW ANGLE (2ω) | D7 | D14 | D19 | D24 |
| WIDE-ANGLE END | 3.60mm | 1.63 | 66.3° | 0.62 | 23.35 | 11.62 | 5.00 |
| TELEPHOTO END | 84.67mm | 3.09 | 3.0° | 22.87 | 1.10 | 8.08 | 8.54 |

FIG. 12B

| ASPHERIC DATA OF EXAMPLE 2 | | | | |
|---|---|---|---|---|
| ASPHERIC COEFFICIENT | SURFACE NUMBER | | | |
| | 16TH SURFACE | 17TH SURFACE | 20TH SURFACE | 21TH SURFACE |
| KA | 0.996271 | 2.4736952 | 1.5304537 | -6.1817894 |
| $RB_3$ | 2.05424E-04 | 2.00839E-04 | 2.63051E-04 | 2.81774E-04 |
| $RB_4$ | -6.85634E-05 | 5.48831E-05 | -2.08460E-06 | 5.71289E-05 |
| $RB_5$ | 1.95298E-06 | 1.53257E-06 | 2.71561E-07 | 2.55750E-06 |
| $RB_6$ | 4.75846E-07 | 2.52749E-07 | 1.20204E-07 | 8.47072E-09 |
| $RB_7$ | 3.03393E-08 | 5.82805E-08 | 1.06856E-08 | -1.40316E-08 |
| $RB_8$ | -1.01897E-09 | 4.05813E-09 | 6.39866E-10 | -2.98348E-09 |
| $RB_9$ | -7.72479E-11 | 5.57743E-10 | 6.54149E-11 | -4.48123E-10 |
| $RB_{10}$ | 8.59566E-12 | 4.61024E-11 | 1.25160E-12 | -6.47301E-11 |
| $RB_{11}$ | 6.23543E-12 | -1.70010E-12 | -1.85740E-12 | -8.33962E-12 |
| $RB_{12}$ | 1.31308E-12 | -8.59915E-13 | -6.95961E-13 | 4.05257E-13 |
| $RB_{13}$ | 1.62654E-13 | -7.37716E-14 | -1.57557E-13 | -6.01247E-14 |
| $RB_{14}$ | 1.90746E-14 | -3.25192E-15 | -3.91433E-14 | -4.63830E-15 |
| $RB_{15}$ | 4.44618E-16 | 1.61906E-15 | -7.13134E-15 | -8.24667E-16 |
| $RB_{16}$ | -3.17293E-16 | 4.55544E-16 | -1.33365E-15 | 1.81903E-16 |
| $RB_{17}$ | 1.83016E-17 | 2.50022E-17 | 1.85321E-17 | -6.10428E-17 |
| $RB_{18}$ | 7.13871E-19 | 4.33888E-18 | 2.91969E-18 | -1.21720E-17 |
| $RB_{19}$ | -1.10153E-19 | 5.78559E-19 | 3.06369E-19 | -1.91510E-18 |
| $RB_{20}$ | -3.64679E-20 | 8.80494E-20 | -4.95803E-20 | 2.34449E-20 |

FIG. 13

| CONDITIONAL EXPRESSION | VALUES ABOUT CONDITIONAL EXPRESSIONS ||||
|---|---|---|---|---|
| | EXAMPLE 1 | EXAMPLE 2 | EXAMPLE 3 | EXAMPLE 4 |
| (1) \|M2/f2\| | 5.02 | 5.01 | 5.05 | 5.00 |
| (2) ft/f1 | 3.30 | 3.31 | 3.30 | 2.40 |
| (3) \|f2a/f2\| | 1.11 | 1.12 | 1.12 | 1.24 |

FNO.=1.42

-0.1mm  0.1mm
SPHERICAL
ABERRATION

— d-LINE
---- c-LINE
—·— g-LINE

ω=34.9°

-0.1mm  0.1mm
ASTIGMATISM

— SAGITTAL
······ TANGENTIAL

ω=34.9°

-5%  5%
DISTORTION

FNO.=3.39

-0.1mm  0.1mm
SPHERICAL
ABERRATION

— d-LINE
---- c-LINE
—·— g-LINE

ω=1.2°

-0.1mm  0.1mm
ASTIGMATISM

— SAGITTAL
······ TANGENTIAL

ω=1.2°

-5%  5%
DISTORTION

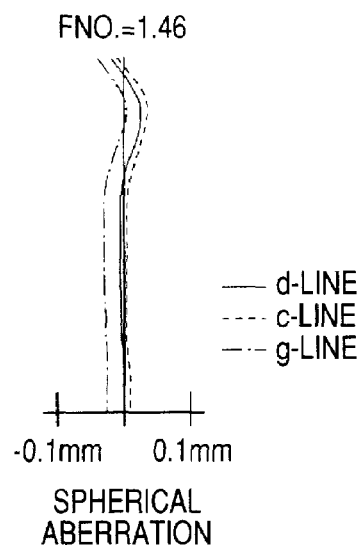
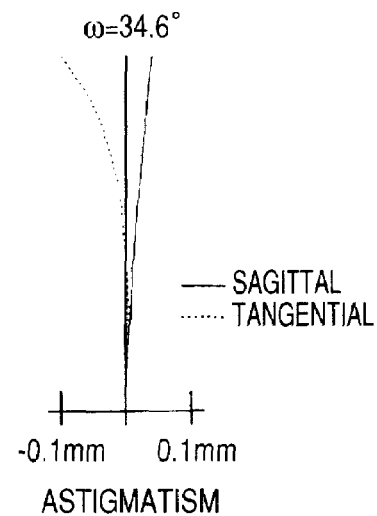
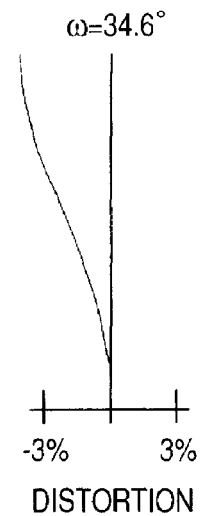
FIG. 18A — FNO.=1.46, SPHERICAL ABERRATION (d-LINE, c-LINE, g-LINE), -0.1mm to 0.1mm
FIG. 18B — ω=34.6°, ASTIGMATISM (SAGITTAL, TANGENTIAL), -0.1mm to 0.1mm
FIG. 18C — ω=34.6°, DISTORTION, -3% to 3%
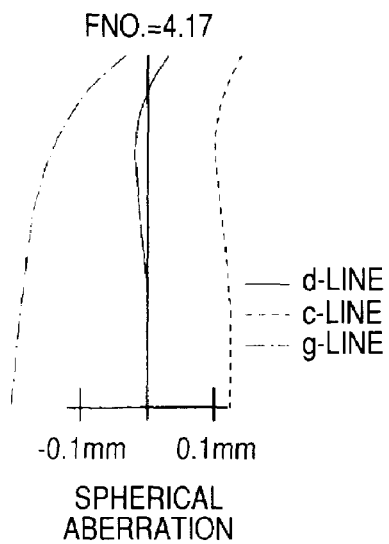
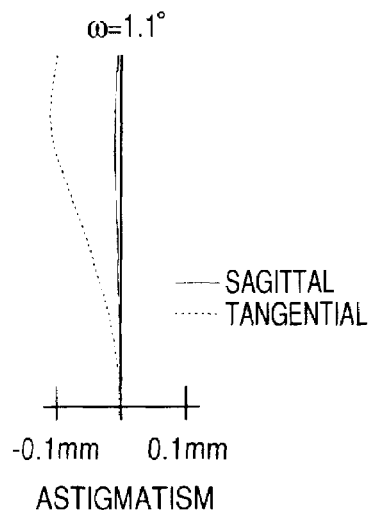
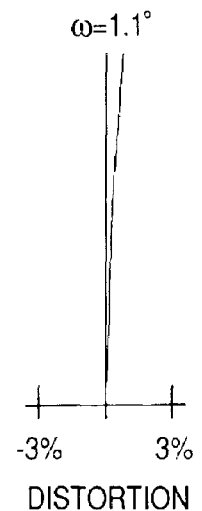
FIG. 19A — FNO.=4.17, SPHERICAL ABERRATION (d-LINE, c-LINE, g-LINE), -0.1mm to 0.1mm
FIG. 19B — ω=1.1°, ASTIGMATISM (SAGITTAL, TANGENTIAL), -0.1mm to 0.1mm
FIG. 19C — ω=1.1°, DISTORTION, -3% to 3%

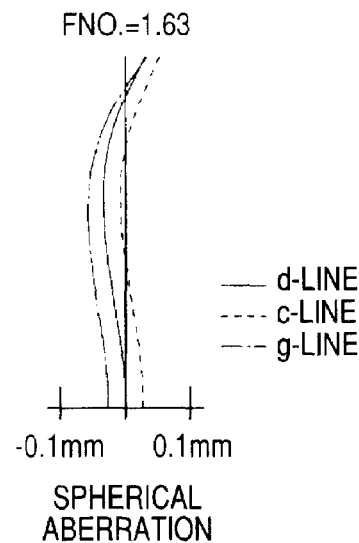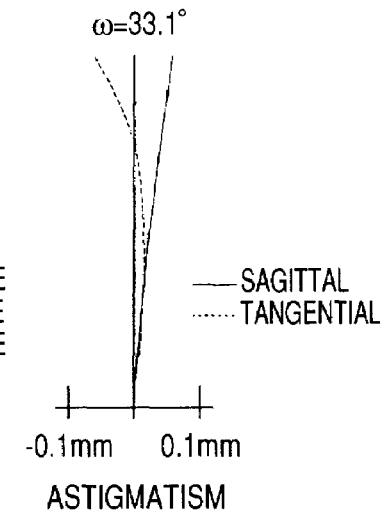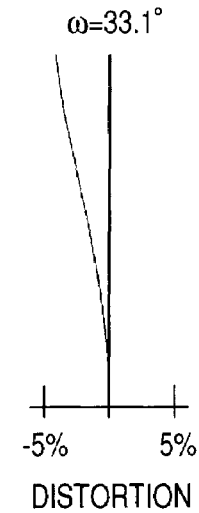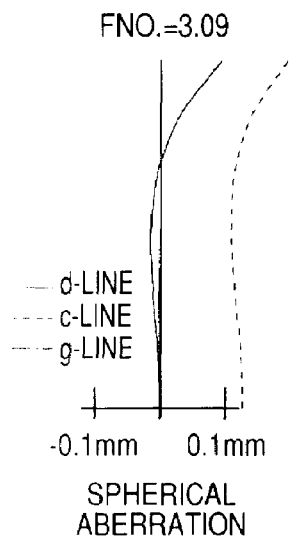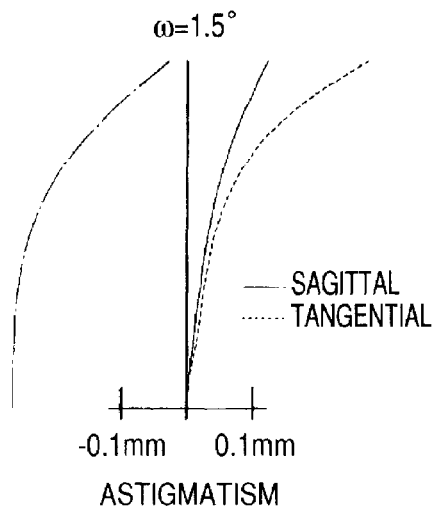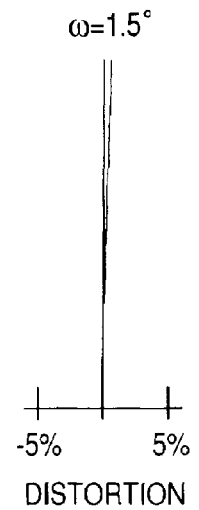

ZOOM LENS

BACKGROUND OF THE INVENTION

1. Field of the Invention

The present invention relates to a high-power zoom lens, which has a zoom ratio of about 24 to 34 times and which can be used in a video camera, an electronic still camera, etc., and particularly relates to a miniaturized high-power zoom lens, which can be used suitably for a surveillance video camera.

2. Description of Related Art

For example, as a zoom lens heretofore used in a video camera, an electronic still camera, etc., there is known a four-group system zoom lens in which a first group and a third group are set as fixed groups, and a second group is moved along an optical axis so as to perform zooming, while the fluctuation of the imaging position caused by the zooming is compensated by moving the fourth group along the optical axis. Japanese Patent No. 3601733 discloses a configuration in which a fifth group is added as another fixed group in order to obtain a zoom lens having a wider angle and a higher zoom ratio than such a four-group system zoom lens.

The configuration disclosed in Japanese Patent No. 3601733 can obtain a high-power zoom lens having a zoom ratio of about 18 to 20 times. In recent years, however, there has grown a request for a miniaturized surveillance zoom lens which has higher optical performance supporting a higher pixel-density camera and which has a zoom ratio of about 24 to 34 times high enough to cover a wider imaging range. In order to increase the power to about 24 to 34 times in the aforementioned four-group system zoom lens, the axial chromatic aberration and the spherical aberration caused by the first group and increasing in the telephoto end has to be suppressed. In addition, the moving distances of the movable groups increasing with the increasing power have to be suppressed to be as small as possible, while the amount of aberrations is suppressed. It has been desired to develop a four-group system zoom lens satisfying these requests.

SUMMARY OF THE INVENTION

An object of an illustrative, non-limiting embodiment of the invention is to provide a miniaturized high-power zoom lens which can be used suitably for a surveillance video camera or the like.

According to a first aspect of the invention, there is provided a zoom lens including: in order from an object side of the zoom lens, a first group having a positive refractive power; a second group having a negative refractive power; an aperture stop; a third group having a positive refractive power; and a fourth group having a positive refractive power. In zooming from a wide-angle end to a telephoto end, the first group and the third group are fixed, and the second group is moved to an image side thereof along an optical axis so as to perform zooming, while the fourth group is moved along the optical axis so as to compensate the fluctuation of the imaging position caused by the zooming and perform focusing. The first group has a three-group four-lens configuration in which a cemented lens of one negative lens and one positive lens, and two positive single-lenses are arranged in this order from the object side, and the second group has a three-group four-lens configuration in which two single-lenses each having a negative refractive power with a strong concave surface on the image side, and a cemented lens of one double-concave lens and one positive lens are arranged in this order from the object side. The zoom lens satisfies the following conditions:

$$4.0 < |M2/f2| < 6.0 \tag{1}$$

$$2.2 < ft/f1 < 4.00 \tag{2}$$

where M2 designates a moving distance of the second group from the wide-angle end to the telephoto end, f2 designates a focal length of the second group, ft designates a focal length of the total optics (the zoom lens) in the telephoto end, and f1 designates a focal length of the first group.

In the first aspect of the invention, the first group and the third group are set as fixed groups, and the second group is moved along the optical axis so as to perform zooming, while the fluctuation of the imaging position caused by the zooming is compensated by moving the fourth group along the optical axis. Particularly, the first group is formed into a three-group four-lens configuration of a cemented lens and two positive single-lenses, and the second group is formed into a three-group four-lens configuration of two single-lenses and a cemented lens. The refractive powers and the numbers of lenses in the first group and the second group are set suitably. Thus, it is possible to obtain a lens system small in size and high in power.

The zoom lens according to the first configuration of the invention is preferably designed so that the third group has a two-group two-lens configuration in which a double-convex lens having at least one aspheric surface, and a negative meniscus lens having a concave surface on the object side are arranged in this order from the object side. It is also preferable that the fourth group has a two-group three-lens configuration in which a double-convex lens having at least one aspheric surface, and a cemented lens of a negative meniscus lens having a concave surface on the image side and one positive lens are arranged in this order from the object side. Further it is also preferable that an image-side surface of the positive lens of the cemented lens in the fourth group is a flat surface or a concave surface.

According to a second aspect of the invention, there is provided a zoom lens including: in order from an object side of the zoom lens, a first group having a positive refractive power; a second group having a negative refractive power; an aperture stop; a third group having a positive refractive power; and a fourth group having a positive refractive power. In zooming from a wide-angle end to a telephoto end, the first group and the third group are fixed, and the second group is moved to an image side thereof along an optical axis so as to perform zooming, while the fourth group is moved along the optical axis so as to compensate the fluctuation of the imaging position caused by the zooming and perform focusing. The second group has a configuration in which at least a single lens, and a cemented lens of one double-concave lens and one positive lens are arranged in this order from the object side, and the second group satisfies the following condition:

$$0.9 < |f2a/f2| < 1.80 \tag{3}$$

where f2a designates a focal length of the lens closer to the object side than the cemented lens in the second group, and f2 designates a focal length of the second group.

In the zoom lens according to the second configuration of the invention, the first group and the third group are set as fixed groups, and the second group is moved along the optical axis so as to perform zooming, while the fluctuation of the imaging position caused by the zooming is compensated by moving the fourth group along the optical axis. Particularly, the second group serving as a zooming group is constituted by at least one single lens and a cemented lens so as to satisfy the conditional expression (3). Thus, it is possible to obtain a lens system small in size and high in power.

In order to satisfy the conditional expression (3), it is preferable that the second group has a three-group four-lens configuration in which two single-lenses each having a negative refractive power with a strong concave surface on the image side, and a cemented lens of one double-concave lens and one positive lens are arranged in this order from the object side.

BRIEF DESCRIPTION OF THE DRAWINGS

The features of the invention will appear more fully upon consideration of the exemplary embodiment of the invention, which are schematically set forth in the drawings, in which:

FIG. 5 is a table showing fundamental lens data of a zoom lens according to Example 1;

FIGS. 6A-6B are tables showing other lens data of the zoom lens according to Example 1, wherein FIG. 6A shows data about zooming and FIG. 6B shows data about aspheric surfaces;

FIG. 7 is a table showing fundamental lens data of a zoom lens according to Example 2;

FIGS. 8A-8B are tables showing other lens data of the zoom lens according to Example 2, wherein FIG. 8A shows data about zooming and FIG. 8B shows data about aspheric surfaces;

FIG. 9 is a table showing fundamental lens data of a zoom lens according to Example 3;

FIGS. 10A-10B are tables showing other lens data of the zoom lens according to Example 3, wherein FIG. 10A shows data about zooming and FIG. 10B shows data about aspheric surfaces;

FIG. 11 is a table showing fundamental lens data of a zoom lens according to Example 4;

FIGS. 12A-12B are tables showing other lens data of the zoom lens according to Example 4, wherein FIG. 12A shows data about zooming and FIG. 12B shows data about aspheric surfaces;

FIG. 13 is a table collectively showing values about conditional expressions in the respective examples.

FIGS. 14A-14C are aberration diagrams showing various aberrations in a wide-angle end of the zoom lens according to Example 1, wherein FIG. 14A shows spherical aberration, FIG. 14B shows astigmatism and FIG. 14C shows distortion;

FIGS. 15A-15C are aberration diagrams showing various aberrations in a telephoto end of the zoom lens according to Example 1, wherein FIG. 15A shows spherical aberration, FIG. 15B shows astigmatism and FIG. 15C shows distortion;

FIGS. 16A-16C are aberration diagrams showing various aberrations in a wide-angle end of the zoom lens according to Example 2, wherein FIG. 16A shows spherical aberration, FIG. 16B shows astigmatism and FIG. 16C shows distortion;

FIGS. 17A-17C are aberration diagrams showing various aberrations in a telephoto end of the zoom lens according to Example 2, wherein FIG. 17A shows spherical aberration, FIG. 17B shows astigmatism and FIG. 17C shows distortion;

FIGS. 18A-18C are aberration diagrams showing various aberrations in a wide-angle end of the zoom lens according to Example 3, wherein FIG. 18A shows spherical aberration, FIG. 18 shows astigmatism and FIG. 18C shows distortion;

FIGS. 19A-19C are aberration diagrams showing various aberrations in a telephoto end of the zoom lens according to Example 3, wherein FIG. 19A shows spherical aberration, FIG. 19B shows astigmatism and FIG. 19C shows distortion;

FIGS. 20A-20C are aberration diagrams showing various aberrations in a wide-angle end of the zoom lens according to Example 4, wherein FIG. 20A shows spherical aberration, FIG. 20 shows astigmatism and FIG. 20C shows distortion; and FIGS. 21A-21C are aberration diagrams showing various aberrations in a telephoto end of the zoom lens according to Example 4, wherein FIG. 21A shows spherical aberration, FIG. 21B shows astigmatism and FIG. 21C shows distortion.

DETAILED DESCRIPTION OF THE EXEMPLARY EMBODIMENTS

Although the invention will be described below with reference to the exemplary embodiments thereof, the following exemplary embodiments and modifications do not restrict the invention.

According to an exemplary embodiment of a first aspect of the invention, the first group and the third group are set as fixed groups, and the second group is moved along the optical axis so as to perform zooming, while the fluctuation of the imaging position caused by the zooming is compensated by moving the fourth group along the optical axis. In the four-group system zoom lens configured thus, particularly, the refractive powers and the numbers of lenses in the first group and the second group serving as a zooming group are set suitably. Thus, it is possible to obtain a lens system small in size and high in power to be used suitably for a surveillance video camera or the like.

According to an exemplary embodiment of a second aspect of the invention, the first group and the third group are set as fixed groups, and the second group is moved along the optical axis so as to perform zooming, while the fluctuation of the imaging position caused by the zooming is compensated by moving the fourth group along the optical axis. In the four-group system zoom lens configured thus, particularly, the second group serving as a zooming group is set suitably. Thus, it is possible to obtain a lens system small in size and high in power to be used suitably for a surveillance video camera or the like.

Exemplary embodiments of the invention will be described below in detail with reference to the drawings.

Figure 1:
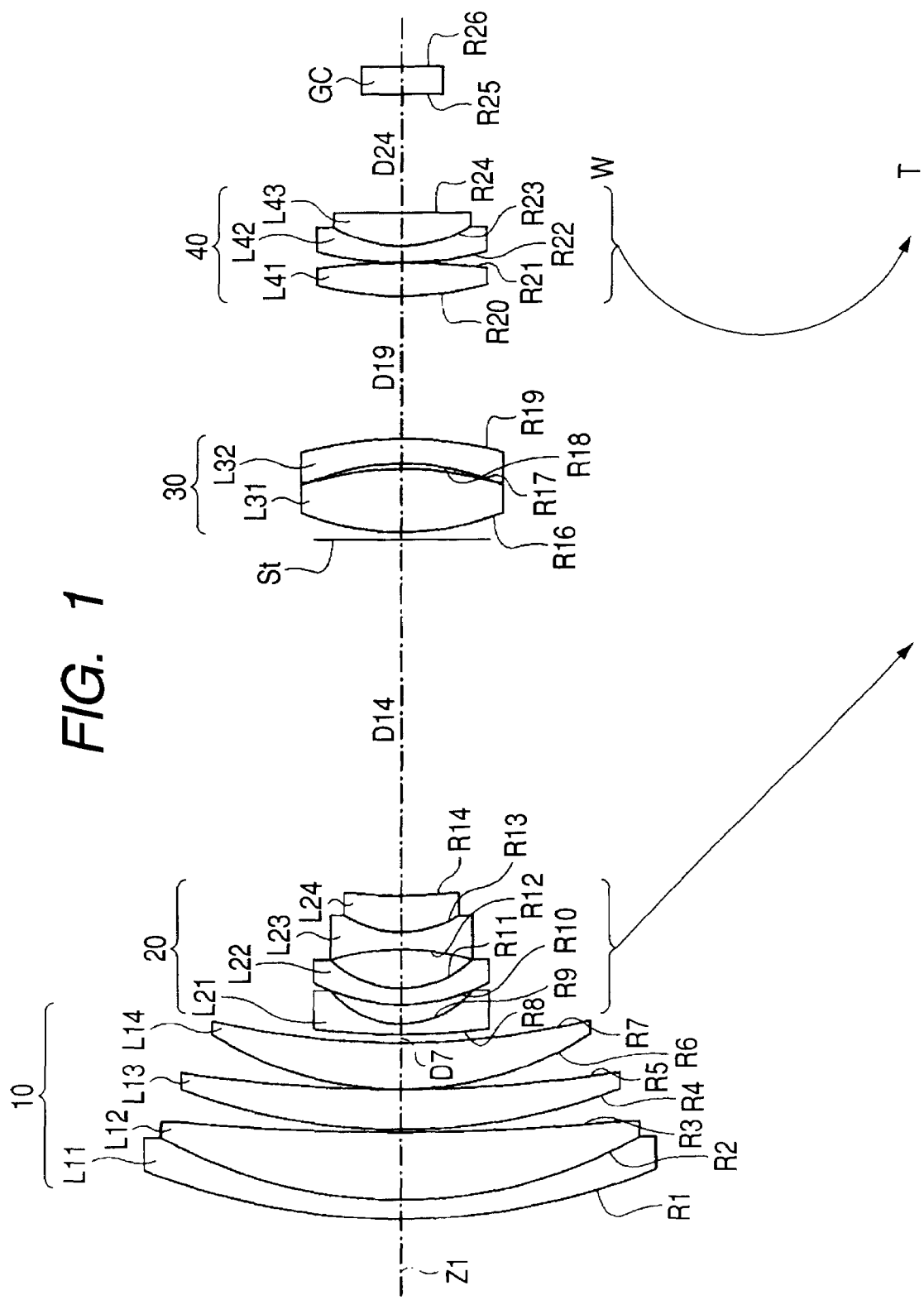
FIG. 1 is a sectional view showing a first example of a zoom lens according to an exemplary embodiment of the invention, correspondingly to Example 1.
Figure 2:
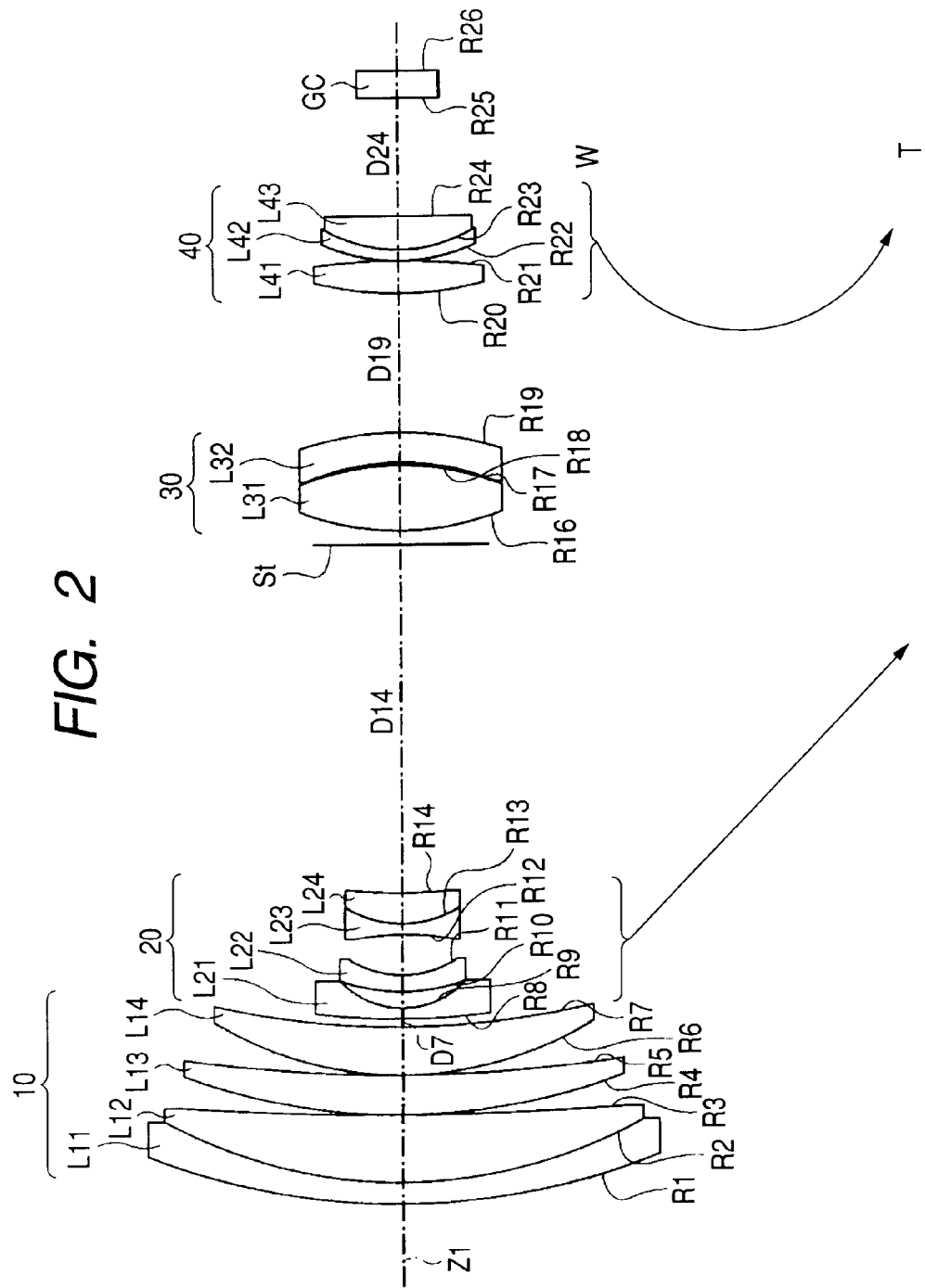
FIG. 2 is a sectional view showing a second example of a zoom lens according to an exemplary embodiment of the invention, correspondingly to Example 2.
Figure 3:
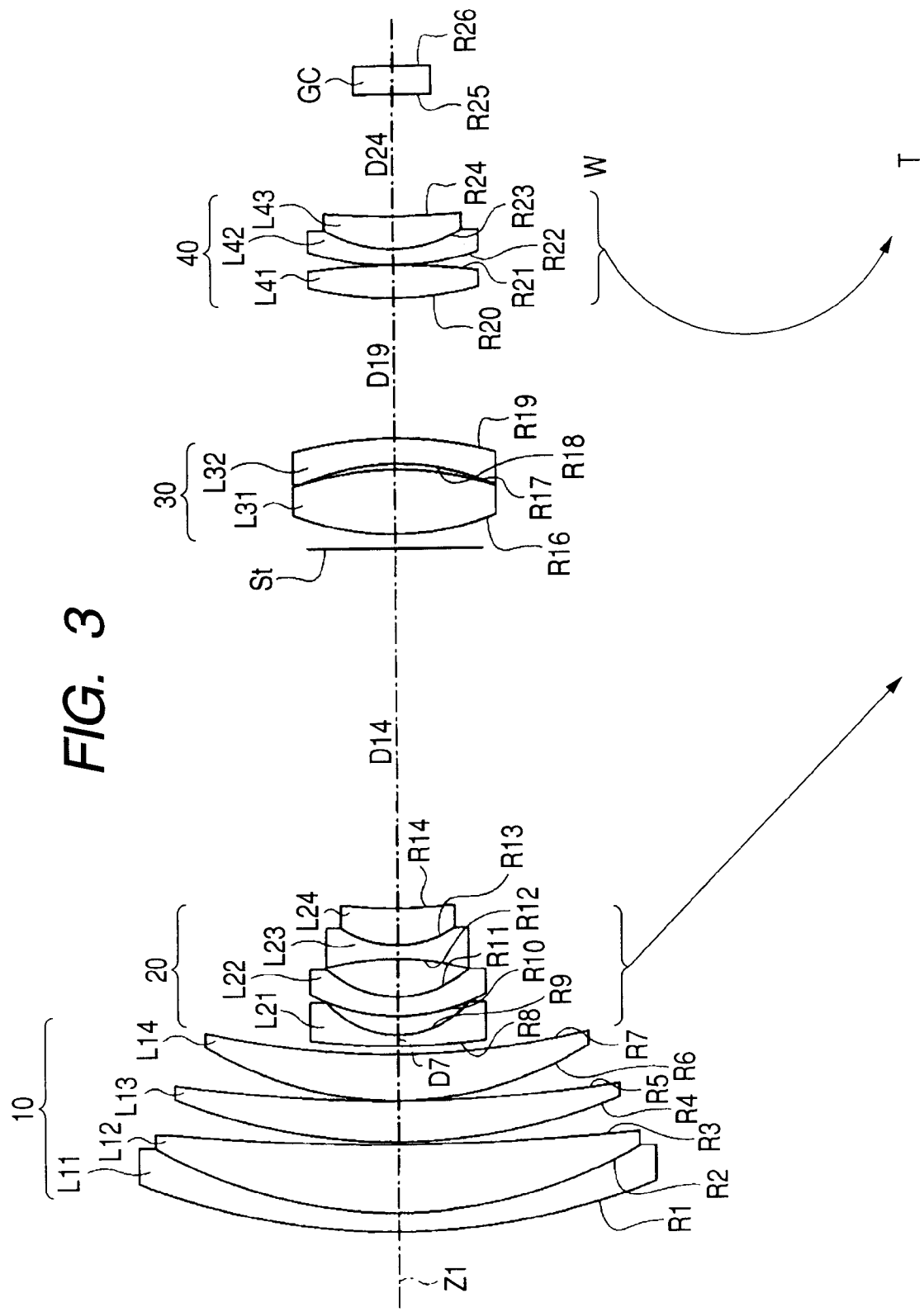
FIG. 3 is a sectional view showing a third example of a zoom lens according to an exemplary embodiment of the invention, correspondingly to Example 3.
Figure 4:
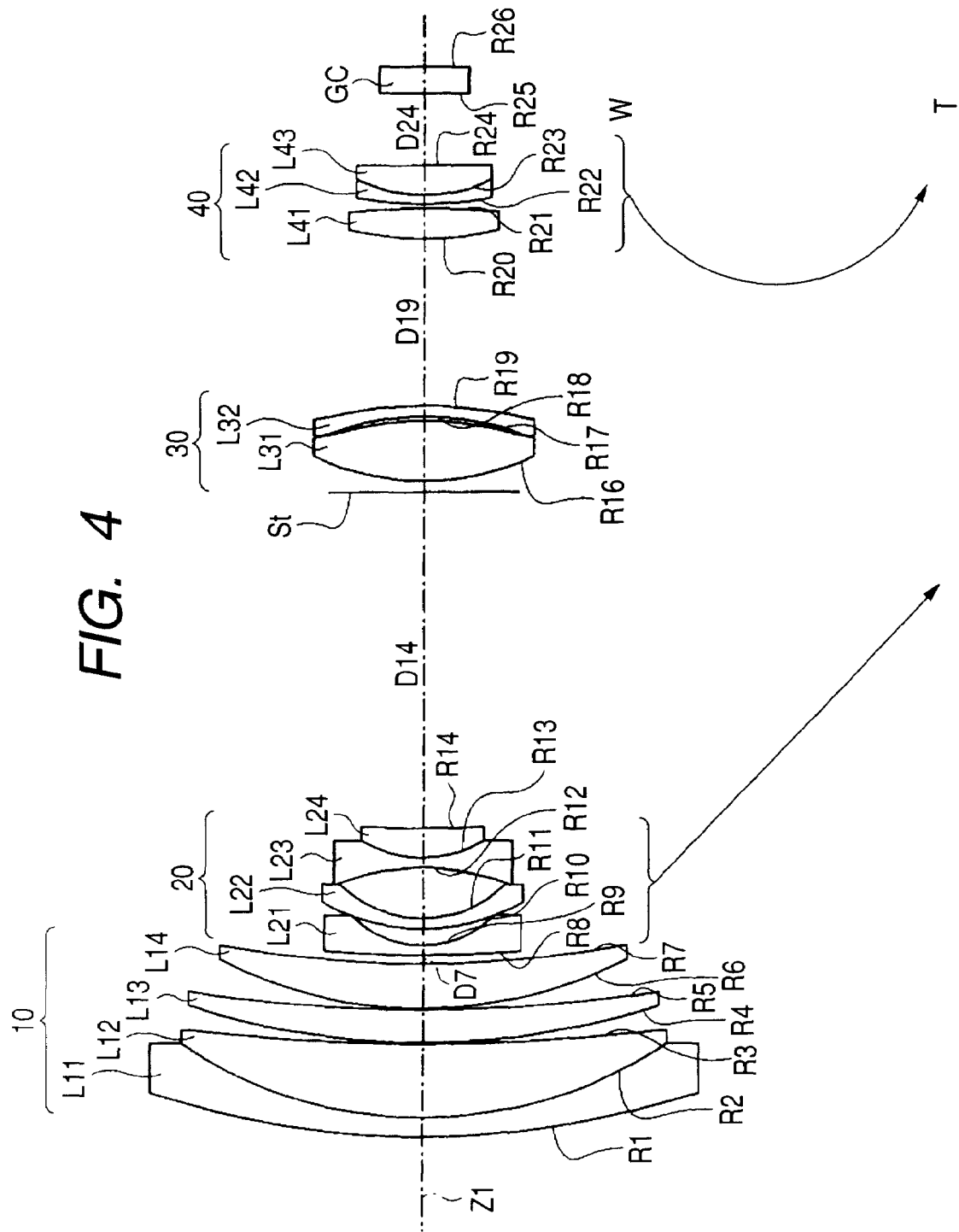
FIG. 4 is a sectional view showing a fourth example of a zoom lens according to an exemplary embodiment of the invention, correspondingly to Example 4.

FIG. 1 shows a first example of a zoom lens according to a first exemplary embodiment of the invention. This example corresponds to the lens configuration of a first numerical example (FIG. 5 and FIGS. 6A-6B) which will be described later. FIG. 2 shows a second exemplary example. This example corresponds to the lens configuration of a second numerical example (FIG. 7 and FIGS. 8A-8B) which will be described later. FIG. 3 shows a third exemplary example. This example corresponds to the lens configuration of a third numerical example (FIG. 9 and FIGS. 10A-10B) which will be described later. FIG. 4 shows a fourth exemplary example. This example corresponds to the lens configuration of a fourth numerical example (FIG. 11 and FIGS. 12A-12B) which will be described later. In FIGS. 1-4, the reference sign Ri designates the curvature radius of an i-th surface on the assumption that the first surface is a surface of a constituent element located nearest to an object side, and the suffix i is given to increase sequentially as the i-th surface is nearer to an image side (imaging side). The reference sign Di designates the surface spacing on an optical axis Z1 between the i-th surface and the (i+1)-th surface. As for the reference sign Di, only the surface spacing D7, D14, D19 and D24 which are variable in accordance with zooming are shown. The configuration examples have the same fundamental configuration. Description will be made below with reference to the first example shown in FIG. 1.

This zoom lens is used for a video camera, an electronic still camera, or the like. Particularly the zoom lens is used suitably for a surveillance video camera. The zoom lens has a first group 10, a second group 20, an aperture stop St, a third group 30 and a fourth group 40 disposed along the optical axis Z1 in this order from the object side. The first group 10 has a positive refractive power. The second group 20 has a negative refractive power. The third group 30 disposed just behind the aperture stop St has a positive refractive power. The fourth group 40 has a positive refractive power.

A not-shown imaging device such as a CCD (Charge Coupled Device) or a CMOS (Complementary Metal Oxide Semiconductor) is disposed on an imaging plane of the zoom lens. For example, a cover glass GC for protecting the imaging plane is disposed between the fourth group 40 and the imaging device. In addition, a flat-sheet optical member such as an infrared cut filter may be disposed in accordance with the configuration of a camera where the lens will be mounted.

When zooming from a wide-angle end to a telephoto end is performed in the zoom lens, the first group 10 and the third group 30 are fixed, and the second group 20 is moved to the image side along the optical axis so as to perform zooming, while the fourth group 40 is moved along the optical axis so as to compensate the fluctuation of the imaging position caused by the zooming and perform focusing. The second group 20 and the fourth group 40 move to draw trajectories shown by the solid lines in FIG. 1 in accordance with the zooming from the wide-angle end to the telephoto end. In FIGS. 1-3, the reference sign W designates a lens position in the wide-angle end, and T designates a lens position in the telephoto end.

The first group 10 has a three-group four-lens configuration in which a cemented lens of one negative lens L11 and one positive lens L12, and two positive single-lenses L13 and L14 are arranged in this order from the object side. It is preferable that the negative lens L11 is a negative meniscus lens having a convex surface on the object side, and the positive lens L12 is a positive meniscus lens having a convex surface on the object side. It is preferable that the positive single-lenses L13 and L14 are positive meniscus lenses each having a convex surface on the object side.

The second group 20 is constituted by at least one single lens and a cemented lens arranged in this order from the object side. The cemented lens has one double-concave lens and one positive lens. More specifically, the second group 20 has a three-group four-lens configuration in which two single-lenses L21 and L22 each having a negative refractive power with a strong concave surface on the image side, whose curvature is stronger than a curvature on the object side and a cemented lens of one double-concave lens L23 and one positive lens L24 are arranged in this order from the object side. It is preferable that the negative single-lenses L21 and L22 are negative meniscus lenses each having a convex surface on the object side.

The first group 10 and the second group 20 satisfy the following conditional expressions (1) and (2).

$$4.0<|M2/f2|<6.0 \qquad (1)$$

$$2.2<ft/f1<4.00 \qquad (2)$$

where M2 designates a moving distance of the second group 20 from the wide-angle end to the telephoto end, f2 designates a focal length of the second group 20, ft designates a focal length of the total optics in the telephoto end, and f1 designates a focal length of the first group 10.

It is preferable that the second group 20 further satisfies the following conditional expression (3)

$$0.9<|f2a/f2|<1.80 \qquad (3)$$

where f2a designates a focal length of lenses L21 and L22 closer to the object side than the cemented lens in the second group 20, and f2 designates a focal length of the second group 20.

The third group 30 has a two-group two-lens configuration in which a double-convex lens L31 having at least one aspheric surface and a negative meniscus lens L32 having a concave surface on the object side are arranged in this order from the object side. The fourth group 40 has a two-group three-lens configuration in which a double-convex lens L41 having at least one aspheric surface, and a cemented lens of one negative meniscus lens L42 having a concave surface on the image side and one positive lens L43 are arranged in this order from the object side. The image-side surface of the positive lens L43 forming the cemented lens in the fourth group 40 is a flat surface (examples of FIGS. 1, 2 and 4) or a concave surface (example of FIG. 3).

Next, the operation and effect of the zoom lens configured as described above will be described.

In this zoom lens, the first group 10 and the third group 30 are set as fixed groups, and the second group 20 is moved along the optical axis so as to perform zooming, while the fluctuation of the imaging position caused by the zooming is compensated by moving the fourth group 40 along the optical axis. In the first group 10, the cemented lens is disposed on the object side, and the two positive single-lenses L13 and L14 are disposed behind the cemented lens. Thus, the positive power is distributed to improve various aberrations. In the second group 20 serving as a zooming group, the cemented lens is disposed on the image side, and the two negative single-lenses L21 and L22 are disposed in front of the cemented lens. Thus, the negative power is distributed to improve various aberrations.

The conditional expression (1) defines a proper relation between the moving distance and the refractive power of the second group 20 serving as a zooming group. If the ratio is higher than the upper limit of the conditional expression (1), higher power can be obtained, but the refractive power of the second group 20 will be so high that the correction of the spherical aberration in the telephoto end will be insufficient. In addition, when the moving distance M2 of the second group 20 increases, the zooming lens will be prevented from being made compact. It is not preferable that the ratio is lower than the lower limit because high power cannot be expected.

The conditional expression (2) defines a proper relation about the refractive power of the first group 10. If the ratio is higher than the upper limit of the conditional expression (2), the refractive power of the first group 10 will be so high that the correction of the spherical aberration in the telephoto end will be excessive, and the axial chromatic aberration will also increase. It is not preferable that the ratio is lower than the lower limit because the focal length of the first group 10 is so long that the zooming lens is prevented from being made compact.

The conditional expression (3) defines a proper relation between the cemented lens and the other lens in the second group 20 serving as a zooming group. If the ratio is higher than the upper limit of the conditional expression (3), the negative refractive power of the cemented lens in the second group 20 will increase. As a result, the function to correct aberration occurring due to the lenses closer to the object side than the cemented lens will be lowered so that the amount of aberration occurring due to the second group 20 will increase. If the ratio is lower than the lower limit, the refractive power of the lenses closer to the object side than the cemented lens in the second group 20 will increase so that aberration occurring due to the lenses closer to the object side than the cemented lens will increase. As a result, the correction of aberration in the cemented lens will be so insufficient that the amount of aberration occurring due to the second group 20 will increase unpreferably. In order to satisfy the conditional expression (3), it is preferable that the second group 20 has a three-group four-lens configuration in which the two single-lenses L21 and L22 each having negative refractive power with a strong concave surface on the image side, and the cemented lens of the double-concave lens L23 and the positive lens L24 are arranged in this order from the object side.

As described above, the zoom lens according to this embodiment is a four-group system zoom lens in which particularly the refractive powers and the numbers of lenses of the first group 10 and the second group 20 serving as a zooming group are set suitably. Accordingly, it is possible to obtain a lens system small in size and high in power to be used suitably for a surveillance video camera or the like.

Next, description will be made on specific numerical examples of zoom lenses according to this embodiment. First to fourth numerical examples will be described together below.

FIG. 5 and FIGS. 6A-6B show specific lens data (Example 1) corresponding to the configuration of the zoom lens shown in FIG. 1. Particularly, FIG. 5 shows fundamental lens data thereof. FIG. 6A shows data variable in accordance with zooming, and FIG. 6B shows data about aspheric surfaces.

In the lens data shown in FIG. 5, in the field of a surface number Si, the number of an i-th (i=1 to 26) surface is shown on the assumption that the first surface is a surface of a constituent element located nearest to the object side, and the suffix i is given to increase sequentially as the i-th surface Si is nearer to the image side. In the field of a curvature radius Ri, the curvature radius of the i-th surface from the object side is shown correspondingly to the reference sign Ri shown in FIG. 1. In the field of a surface spacing Di, the spacing on the optical axis between the i-th surface Si and the (i+1)-th surface Si+1 from the object side is shown likewise. The values of the curvature radius Ri and the surface spacing Di are expressed by units of millimeters (mm). In the fields of Ndj and vdj, a refractive index and an Abbe number of a j-th (j=1 to 14) optical element from the object side for a d-line (wavelength 587.6 nm) are shown respectively.

In the zoom lens according to Example 1, the second group 20 and the fourth group 40 move on the optical axis in accordance with zooming. The values of surface spacing D7, D14, D19 and D24 around these groups are therefore variable. FIG. 6A shows data about values of the surface spacing D7, D14, D19 and D24 in the wide-angle end and the telephoto end at the time of zooming. FIG. 6A also shows the paraxial focal length f (mm) of the total system, the F-number (FNO.) and the view angle 2ω (ω: half angle of view) in the wide-angle end and the telephoto end. The zoom ratio of the zoom lens according to Example 1 is about 34 times.

In the lens data of FIG. 5, the mark * on the left side of its surface number designates the lens surface has an aspherical shape. In the zoom lens according to Example 1, the both surfaces S16 and S17 of the double-convex lens L31 in the third group 30 and the both surfaces S20 and S21 of the double-convex lens L41 in the fourth group 40 have aspherical shapes. The fundamental lens data in FIG. 5 include numeric values of curvature radii near the optical axis as the curvature radii of the aspheric surfaces.

In each numeric value shown as aspheric data in FIG. 6B, the sign "E" designates the numeric value following the sign "E" is an "exponent" in base 10, and the numeric value followed by the sign "E" is multiplied by the numeric value expressed by an exponential function in base 10. For example, "1.0E-02" designates "$1.0 \times 10^{-2}$".

The aspheric data include values of coefficients $RB_i$ and KA in an equation of an aspheric surface shape expressed by the following equation (A). More in detail, Z designates the length (mm) of a perpendicular line dropped on a tangent plane (a plane perpendicular to the optical axis) of a summit of an aspheric surface from a point on the aspheric surface located at height h from the optical axis. Each aspheric surface in the zoom lens according to Example 1 is expressed by effective use of 3 to 16 order coefficients $RB_3$ to $RB_{16}$ as the aspheric coefficient $RB_i$.

$$Z = C \cdot h^2 / \{1 + (1 - KA \cdot C^2 \cdot h^2)^{1/2}\} + \Sigma RB_i h^i \quad (A)$$

(i=3 to n, n is an integer not smaller than 3)

where:

Z: depth (mm) of aspheric surface h: distance (height) (mm) from optical axis to lens surface K: conic constant C: paraxial curvature=1/R (R: paraxial curvature radius)

$RB_i$: i-order aspheric coefficient

In the same manner as the zoom lens according to Example 1 described above, lens data of a zoom lens according to Example 2 are shown in FIG. 7 and FIGS. 8A-8B. Similarly, lens data of a zoom lens according to Example 3 are shown in FIG. 9 and FIGS. 10A-10B. Similarly, lens data of a zoom lens according to Example 4 are shown in FIG. 11 and FIGS. 12A-12B. In the same manner as in Example 1, the zoom lenses according to Examples 2 and 3 also have a zoom ratio of about 34 times. The zoom lenses according to Example 4 have a zoom ratio of about 24 times. In each of Examples 2 to 4, the both surfaces S16 and S17 of the double-convex lens L31 in the third group 30 and the both surfaces S20 and S21 of the double-convex lens L41 in the fourth group 40 have aspheric shapes, as in the same manner as in Example 1. In Examples 2 and 3, each aspheric surface is expressed by effective use of 3 to 16 order coefficients $RB_3$ to $RB_{16}$ as the aspheric coefficient $RB_i$, as in the same manner as in Example 1. In Example 4, each aspheric surface is expressed by effective use of 3 to 20 order coefficients $RB_3$ to $RB_{20}$ as the aspheric coefficient $RB_i$.

FIG. 13 collectively shows values about the aforementioned conditional expressions (1) to (3) in each example. As is understood from FIG. 13, the zoom lenses according to the respective examples are within the ranges of the numeric values of the respective conditional expressions.

Figure 14A:
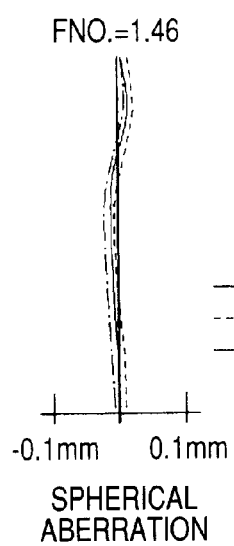
Figure 14B:
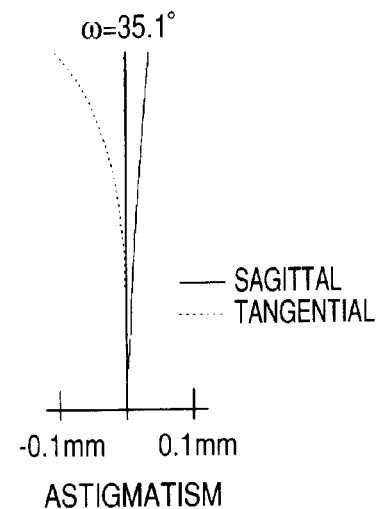
Figure 14C:
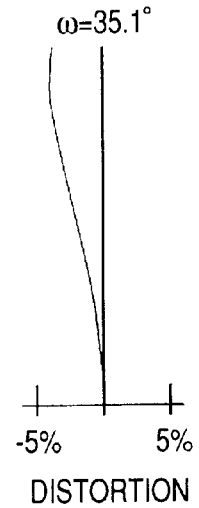
Figure 15A:
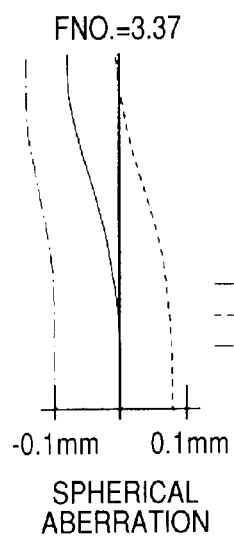
Figure 15B:
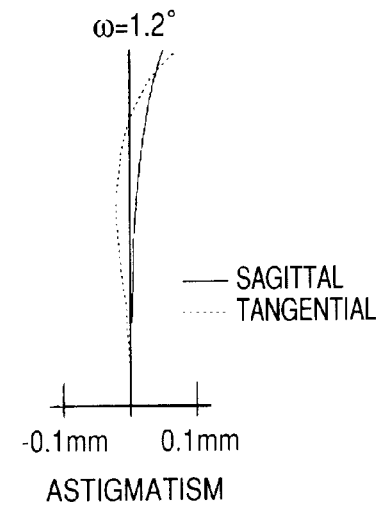
Figure 15C:
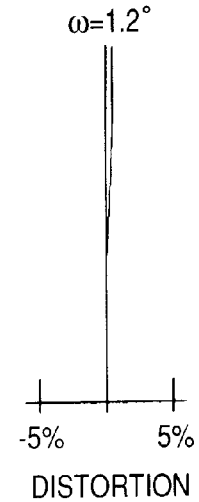

FIGS. 14A-14C show spherical aberration, astigmatism and distortion (distortional aberration) in the wide-angle end in the zoom lens of Example 1 respectively. FIGS. 15A-15C show similar aberrations in the telephoto end respectively. Each aberration diagram shows aberration at the d-line as reference wavelength. The spherical aberration diagram also shows aberrations at the g-line (wavelength 435.8 nm) and the C-line (wavelength 656.3 nm). In the astigmatism diagram, the solid line shows aberration in a sagittal direction, and the broken line shows aberration in a tangential direction. FNO. designates an F-number, and ω designates half an angle of view.

Figure 16A:
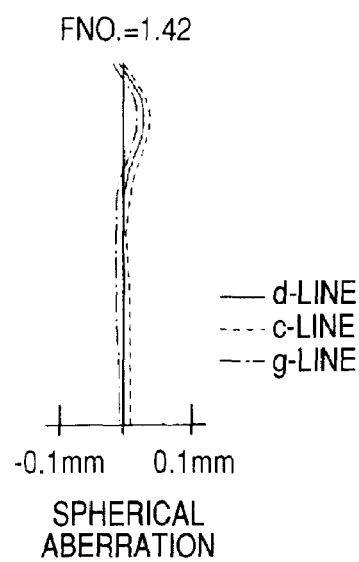
Figure 16B:
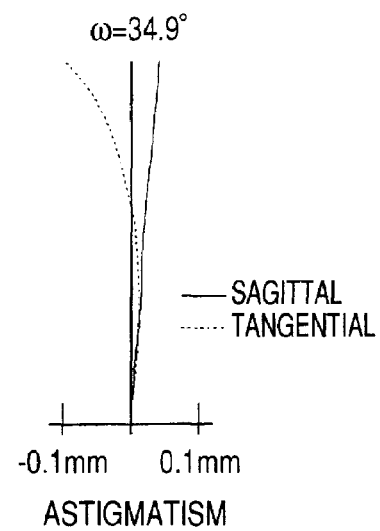
Figure 16C:
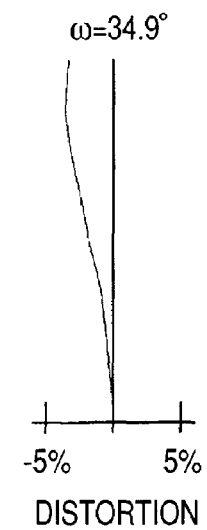
Figure 17A:
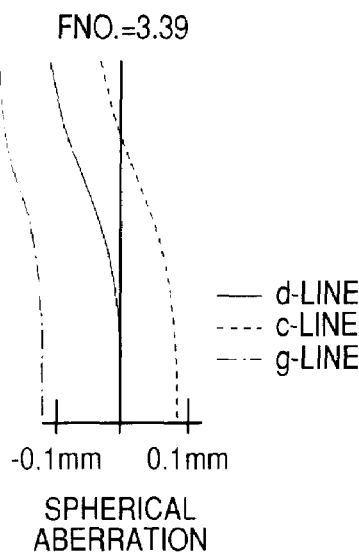
Figure 17B:
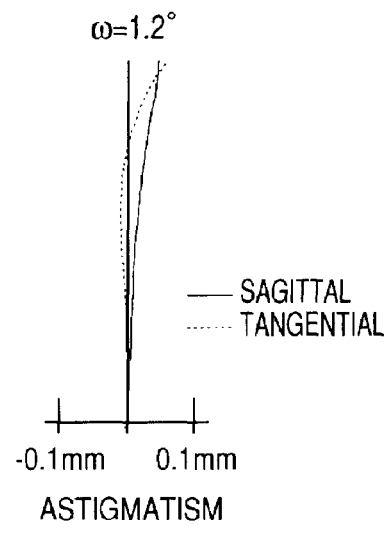
Figure 17C:
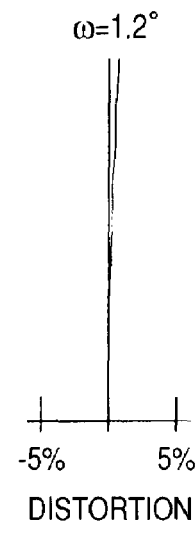

Similarly, various aberrations in the zoom lens of Example 2 are shown in FIGS. 16A-16C (wide-angle end) and FIGS. 17A-17C (telephoto end). Similarly, various aberrations in the zoom lens of Example 3 are shown in FIGS. 18A-18C (wide-angle end) and FIGS. 19A-19C (telephoto end). Similarly, various aberrations in the zoom lens of Example 4 are shown in FIGS. 20A-20C (wide-angle end) and FIGS. 21A-21C (telephoto end).

As is understood from the numeric data and the aberration diagrams described above, each example can realize a zoom lens which can correct various aberrations well and which is small in size and high in power to be used suitable for a surveillance video camera or the like.

The invention is not limited to the aforementioned embodiment and the aforementioned examples, but various modifications can be made thereon. For example, the values of the curvature radius, the surface spacing and the refractive index of each lens element are not limited to those shown in any numerical example. They can take other values.

The present application claims foreign priority based on Japanese Patent Application Nos. JP2005-316217 and JP2006-168954, filed Oct. 31, 2005 and Jun. 19, 2006, respectively, the contents of which is incorporated herein by reference.

What is claimed is:

1. A zoom lens comprising: in order from an object side of the zoom lens,
    a first group having a positive refractive power, the first group having a three-group four-lens configuration in which a cemented lens of one negative lens and one positive lens, and two positive single-lenses are arranged in this order from the object side;
    a second group having a negative refractive power, the second group having a three-group four-lens configuration in which two single-lenses each having a negative refractive power with a strong concave surface on an image side thereof, and a cemented lens of one double-concave lens and one positive lens are arranged in this order from the object side;
    an aperture stop;
    a third group having a positive refractive power; and
    a fourth group having a positive refractive power;
    wherein
    when zooming from a wide-angle end to a telephoto end is performed, the first group and the third group are fixed, and the second group is moved to the image side thereof along an optical axis so as to perform the zooming, while the fourth group is moved along the optical axis so as to compensate a fluctuation of an imaging position caused by the zooming and perform focusing, and
    the zoom lens satisfies conditions:

$$4.0 < |M2/f2| < 6.0 \tag{1}$$

$$2.2 < ft/f1 < 4.00 \tag{2}$$

wherein
    M2 designates a moving distance of the second group from the wide-angle end to the telephoto end;
    f2 designates a focal length of the second group;
    ft designates a focal length of the zoom lens in the telephoto end; and
    f1 designates a focal length of the first group.

2. The zoom lens according to claim 1, wherein the third group has a two-group two-lens configuration in which a double-convex lens having at least one aspheric surface, and a negative meniscus lens having a concave surface on the object side are arranged in this order from the object side.

3. The zoom lens according to claim 1, wherein the fourth group has a two-group three-lens configuration in which a double-convex lens having at least one aspheric surface, and a cemented lens of a negative meniscus lens having a concave surface on the image side and one positive lens are arranged in this order from the object side.

4. The zoom lens according to claim 2, wherein the fourth group has a two-group three-lens configuration in which a double-convex lens having at least one aspheric surface, and a cemented lens of a negative meniscus lens having a concave surface on the image side and one positive lens are arranged in this order from the object side.

5. The zoom lens according to claim 3, wherein an image-side surface of the positive lens of the cemented lens in the fourth group is a flat surface or a concave surface.

6. The zoom lens according to claim 4, wherein an image-side surface of the positive lens of the cemented lens in the fourth group is a flat surface or a concave surface.

* * * * *